UNITED STATES PATENT OFFICE 2,775,628
Patented Dec. 25, 1956

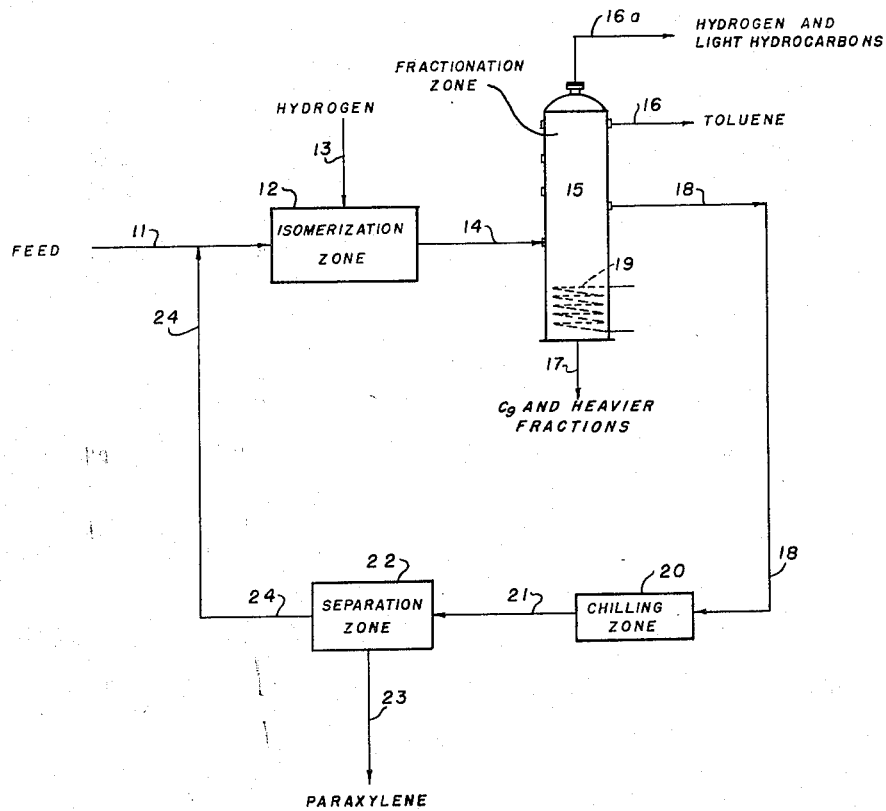

2,775,628

ISOMERIZATION OF XYLENES

Daniel E. Nicholson and Robert H. Perry, Jr., Baytown, Tex., assignors, by mesne assignments, to Esso Research and Engineering Company, Elizabeth, N. J., a corporation of Delaware Application June 10, 1954, Serial No. 435,788

2 Claims. (Cl. 260—668)

The present invention is directed to the isomerization of an isomer of paraxylene to paraxylene. More particularly, the invention is directed to increasing the amount of paraxylene in a hydrocarbon fraction containing less than the equilibrium concentration of paraxylene. In its more specific aspects, the invention is directed to isomerization of an isomer of paraxylene to paraxylene without substantial side cracking and disproportionation reactions.

The present invention may be briefly described as a method of producing paraxylene which comprises contacting an isomer of paraxylene with a silica-alumina catalyst having a surface area in the range between about 10 and about 100 $M^2/g$. in the presence of hydrogen at a temperature in the range between about 800° and about 1100° F. at a pressure in the range from about 15 to 1000 p. s. i. g. and at a liquid space velocity in the range from about 0.2 to about 6 v./v./hr. to form a product containing paraxylene and substantially free of gaseous hydrocarbon materials and hydrocarbons having a lesser number of carbon atoms than the isomer.

It is contemplated in the practice of the present invention that the product may be suitably distilled and subjected to chilling operations to form crystals of paraxylene which may then be separated from the slurry of crystals and mother-liquor by suitable separation operations which may include filtration and/or centrifugation.

It is contemplated that the feed stock employed in the method of the present invention may be an aromatic hydrocarbon feed containing an isomer of paraxylene, such as meta and/or ortho xylene and containing substantially less than the equilibrium concentration of paraxylene. For example, the aromatic hydrocarbon fraction may boil in the range from about 270° to 300° F. and suitably may be a solvent naphtha. A feed stock suitable in the practice of the present invention may have an analysis such as set forth in Table I:

*Table I*

| | |
|---|---|
| Benzene | 0 |
| Toluene | 3 |
| Paraxylene | 8 |
| Total $C_8$ aromatics | 93.5 |
| Total $C_9$ aromatics | 1.0 |
| Total $C_{10}$ aromatics | 0 |
| Total aromatics | 97.5 |

The temperature to be employed in the present invention may suitably range from 800° to 1100° F. with a preferred temperature in the range from 900° to 1000° F.

Pressures may range from about 15 p. s. i. g. to about 1000 p. s. i. g. with a preferred pressure range being from about 200 to about 400 p. s. i. g.

The amount of hydrogen employed is in a range from a molar ratio of hydrogen to total hydrocarbon from about 1:1 to about 10:1 with a preferred range of about 3:1 to about 5:1.

The liquid space velocity may suitably range from about 0.2 to 6 v./v./hr. with a preferred liquid space velocity from about 1 to about 3 v./v./hr.

The catalyst employed in the practice of the present invention may be a silica-alumina catalyst having a surface area from 10 to about 100 $M^2/g$. with a preferred surface area from about 50 to about 80 $M^2/g$. The catalyst may be prepared by treating a silica-alumina cracking catalyst with steam at a pressure in the range from 0 to 100 pounds per square inch gauge at a temperature in the range from 1000° to 1400° F. for about 50 to 100 hours. After this period of time, the catalyst will have the desired surface area for use in the present invention. The catalyst may also be suitably treated by heating same in the absence of steam to a temperature in the range from about 1600° to 1800° F. for 10–30 hours to form the desired surface area.

The percentage of silica and alumina in the catalyst may vary from about 80% to 99% by weight of silica to about 20% to 1% by weight of alumina.

The present invention will be further illustrated by reference to the drawing in which the single figure is a flow diagram of a preferred mode.

Referring now to the drawing, an aromatic hydrocarbon feed, such as one described in Table I, is introduced into the system through line 11 from a source, not shown, and is thereby routed to an isomerization zone 12 illustrated by the rectangle into which hydrogen is introduced by line 13. Isomerization zone 12, while shown only as a rectangle on the drawing, may be understood to include either a fixed bed or fluidized powder-type operation. In a fixed bed operation, the catalyst is to be arranged in beds and the hydrocarbon at the temperature stated is contacted therewith. In a fluidized powder-type operation, the catalyst in a finely divided condition would be suspended in the vaporized hydrocarbon and allowed to contact same under reaction conditions. It is to be understood that isomerization zone 12 is intended to include all auxiliary equipment necessary in either the fixed bed or fluidized powder-type operation.

In any case, the aromatic feed after being subjected to reaction conditions in isomerization zone 12 is discharged by way of line 14 into a separation zone, such as 15, which is illustrated as a fractionating tower but which may be a plurality of separators or fractional distillation towers. It will be understood further that zone 15 may include gas separating means and with respect to the distillation tower will include suitable vapor-liquid internal contacting means, such as bell cap trays and the like. At any rate, zone 15, shown as a distillation zone, is provided with line 16a for removal of lighter materials, such as hydrogen and light hydrocarbons and line 16 for removal of light aromatic hydrocarbons, such as toluene and benzene which may be produced in the process. Unconsumed hydrogen, gaseous hydrocarbons, and benzene and toluene which may be formed in the isomerization reaction are thus removed. The $C_9$ and heavier fractions in the feed as well as small amounts of heavier material formed in the reaction may be withdrawn by line 17 while the paraxylene-containing product is withdrawn by line 18. Zone 15 is provided with a heating means, such as illustrated by a steam coil 19, for adjustment of temperature and pressure therein.

The paraxylene-containing product in line 18 is discharged into a chilling zone, such as 20, which may be a scraped surface chiller wherein the temperature is reduced to a temperature in the range from about −20° to about −100° F. for formation of a slurry of paraxylene crystals and mother liquor. This slurry is then discharged by way of line 21 into a suitable separation zone 22 which may be a centrifugation or filtration zone. Separation zone 22 may comprise a plurality of centrifuges, which under some conditions are preferred. Conditions are adjusted in zone 22 to separate the paraxylene, which is discharged by line 23, for recovery of same from the mother liquor which is discharged by way of line 24 and recycled thereby to line 11.

Thus in accordance with the mode of the invention described with respect to the figure, paraxylene may be obtained from feed stocks containing meta and ortho xylene and deficient in paraxylene. Thus the feed stock employed may be substantially free of paraxylene or may contain substantially less than the equilibrium concentration of paraxylene. The equilibrium concentration of paraxylene in admixture with the other isomers may range from about 17% to about 21% by volume.

It is contemplated that a feed stock suitable for use in the present invention may contain from about 3% to about 12% by volume of paraxylene. With conditions described with respect to the figure the concentration of the paraxylene in the product may be approached to as much as 16% by volume or greater with substantially no formation of gas or of benzene and toluene. Also in the practice of the present invention by using a silica-alumina catalyst of the surface area described supra, cracking and disproportionation reactions are substantially suppressed with little or no formation of higher boiling materials.

The present invention will be further illustrated by a number of runs in which a feed stock, which was a filtrate from a paraxylene crystallization operation, was contacted with a high surface area silica-alumina catalyst having a surface area of about 564 $M^2/g.$ and also with a low surface area silica-alumina catalyst having a surface area of about 80 $M^2/g.$ Runs were made with the catalyst of the present invention under temperature conditions of 900° and 950° F. These runs are set out in Table II:

*Table II*

|  |  | Present Invention |  |
|---|---|---|---|
| Charge Rate, Liq. v./v./hr |  | 2.0 | 2.0 |
| Temperature, ° F |  | 950 | 900 |
| Pressure, p. s. i. g |  | 200 | 200 |
| $H_2$/H. C. Molar Ratio |  | 4./1 | 4./1 |
| Liquid Yield, Wt. Percent of feed |  | 99.1 | 99.4 |
| Gas Yield, Wt. Percent of feed |  | 0.5 | 0.4 |

| Products | Feed |  |  |
|---|---|---|---|
| Paraxylene, Wt. Percent of Total | 7.8 | 15.7 | 14.4 |
| Benzene, Vol. Percent of Total | 0 | 0.8 | 0.5 |
| Toluene, Vol. Percent of Total | 3.0 | 4.1 | 4.5 |
| Total $C_8$ Aromatics, Vol. Percent of Total | 93.4 | 88.4 | 90.4 |
| Total $C_9$ Aromatics, Vol. Percent of Total | 1.2 | 2.1 | 0.9 |
| Total $C_{10}$ Aromatics, Vol. Percent of Total | 0 | 1.3 | 0.5 |
| Total Aromatics, Vol. Percent of Total | 97.5 | 96.7 | 96.8 |

From these data it may be seen that as the temperature is increased, the concentration of paraxylene is increased. Further the data in Table II show that very little gas was produced and that the amount of benzene and toluene produced during the contacting of the feed with the catalyst was negligible. Also it may be noted that at 900° F. the total amount of $C_9$ and $C_{10}$ hydrocarbons was only slightly greater than that in the feed.

In the run at 950° F. slightly greater amounts of $C_9$ and $C_{10}$ hydrocarbons resulted.

Comparative runs were then made with a high surface area silica-alumina catalyst having a surface area of 564 $M^2/g.$ under temperature conditions ranging from 800° to 955° F.

*Table III*

| Charge Rate, Liq. v./v. hr | 2.0 | 1.0 | 2.0 | 2.0 | 0.5 |
|---|---|---|---|---|---|
| Temperature, ° F | 800 | 800 | 900 | 955 | 800 |
| Pressure, p. s. i. g | 200 | 200 | 200 | 200 | 200 |
| $H_2$/H. C. Molar Ratio | 4/1 | 4/1 | 4/1 | 4/1 | 4/1 |
| Liquid Yield, Wt. percent of Feed | 97.9 | 98.3 | 98.4 | 95.6 | 93.8 |
| Gas Yield, Wt. percent of Feed | 2 | 5 | 5 | 4 | 3 |

| Products | Feed |  |  |  |  |  |
|---|---|---|---|---|---|---|
| Paraxylene, Wt. percent of Total | 7.8 | 14.5 | 15.3 | 13.5 | 14.5 | 14.5 |
| Benzene, Vol. percent of total | 0 | 1.2 | 1.9 | 2.2 | 3.0 | 3.0 |
| Toluene, Vol. percent of total | 3.0 | 5.4 | 7.3 | 8.9 | 15.5 | 10.8 |
| Total $C_8$ Aromatics, Vol. percent of total | 93.4 | 84.8 | 75.4 | 73.8 | 68.3 | 71.8 |
| Total $C_9$ Aromatics, Vol. percent of total | 1.2 | 3.1 | 6.8 | 7.7 | 7.8 | 9.2 |
| Total $C_{10}$ Aromatics, Vol. percent of total | 0 | 1.9 | 3.8 | 3.4 | 2.8 | 3.9 |
| Total Aromatics, Vol. percent of total | 97.5 | 96.4 | 95.2 | 96.0 | 97.4 | 97.7 |

It will be noted from the data in Table III that greater amounts of gas were produced at lower temperatures than were produced in the runs in accordance with the present invention. Also it will be noted that the amount of paraxylene was somewhat less than the amount produced in accordance with the practice of the present invention while the amounts of benzene and toluene produced were substantially greater. A like result was obtained with respect to the $C_9$ and $C_{10}$ hydrocarbons. These results show that in the practice of the present invention, the low surface area catalyst is selective to the formation of paraxylene without attendant cracking and disproportionation reactions while the prior art reactions resulted in the formation of substantial amounts of gas and substantial cracking and disproportionation reactions. In short, in the practice of the present invention, the paraxylene is produced substantially selectively without destroying other valuable isomers. Therefore, in accordance with the present invention, by recycling the unconsumed meta and/or ortho xylene, practically complete utilization of the meta and/or ortho xylene to form paraxylene may be obtained. Also in reactions in accordance with the present invention, less loss of ethylbenzene is obtained while maintaining favorable conversions of meta and/or ortho xylene to paraxylene. It is believed that the undesired cracking reactions particularly may involve ethylbenzene.

In the specification and claims, the term $M^2/g.$ refers to the surface area of the catalyst in square meters per gram of catalyst. Thus the present invention is concerned with a low surface area silica-alumina catalyst in isomerization of the meta and/or ortho xylene to paraxylene.

The nature and objects of the present invention having been completely described and illustrated, what we wish to claim as new and useful and to secure by Letters Patent is:

1. A method of producing paraxylene wherein cracking and disproportionation reactions are substantially minimized which comprises contacting an aromatic hydrocarbon fraction containing $C_8$ to $C_{10}$ aromatics and at least one isomer of paraxylene and substantially less than the equilibrium concentration of paraxylene with a catalyst consisting of silica-alumina having a surface area in the range between about 50 and about 80 $M^2/g.$ in the presence of hydrogen in a molar ratio of hydrogen to hydrocarbon in a range between about 3:1 and about 5:1 at a temperature in the range from about 900° to 1000° F. and at a pressure in the range between 200 to about 400 p. s. i. g. and at a liquid space velocity in the range from about 1 to about 3 v./x./hr. to form a product containing paraxylene in an amount substantially greater that the concentration of paraxylene in said hydrocarbon fraction and approaching equilibrium concentration and substantially free of hydrocarbons having a lesser number of carbon atoms than said isomer, and recovering said paraxylene from the product.

2. A method in accordance with claim 1 in which the paraxylene is recovered from said product by crystallization.

References Cited in the file of this patent

UNITED STATES PATENTS

| | | |
|---|---|---|
| 2,403,757 | Reeves | July 9, 1946 |
| 2,532,276 | Birch et al. | Dec. 2, 1950 |
| 2,550,531 | Ciapetta | Apr. 24, 1951 |
| 2,564,388 | Bennett et al. | Aug. 14, 1951 |
| 2,632,779 | Pfennig | Mar. 24, 1953 |

OTHER REFERENCES

Ashley et al.: Industrial and Engineering Chemistry, vol. 44 (1952), pages 2857–63 relied on.